United States Patent Office 3,123,598
Patented Mar. 3, 1964

3,123,598
**21-PIPERAZINE DERIVATIVES OF HYDROCORTI-
SONE AND PREDNISOLONE**
Zoltán Tuba and László Szporny, Budapest, and József
Tóth, Szeged, Hungary, assignors to Richter Gedeon
Vegyészeti Gyár RT., Budapest, Hungary, a firm
No Drawing. Filed July 31, 1962, Ser. No. 213,620
Claims priority, application Hungary Aug. 23, 1961
3 Claims. (Cl. 260—239.5)

This invention relates to corticosteroids substituted in position 21 with piperazine derivatives and their salts, and to a process for their production. In particular, the invention is concerned with hydrocortisone and prednisolone substituted in position 21 with piperazine derivatives, and their salts, these compounds being all of pharmacological value.

It is known that the water-soluble derivatives of the practically water-insoluble steroids are of great importance from a therapeutical point of view. Accordingly, it has been attempted and effectuated, respectively, in different ways to render the steroids soluble in water. The steroid derivatives of glycoside type, the salts of the steroid semi-esters formed with dibasic carboxylic acids, the salts of steroid esters formed with di- or polybasic inorganic acids and the salts of steroid esters formed with N-substituted amino acids have been prepared. For the most part these compounds have not been employed for therapeutical purposes, due partly to the change of their pharmacological effect and partly to difficulties in manufacturing the finished product.

Water-soluble compounds have been described which are the salts of derivatives obtained by esterifying the hydroxyl group in position 21 of corticosteroids with substituted amino acids. In the German Patents Nos. 1,037,451, 1,016,708 as well as 1,069,624 e.g. corticosteroid derivatives are given which contaiin as ester residue on their carbon atom of position 21 an amino-acid part substituted with a piperazine ring. However, the above-mentioned difficulties in manufacturing the finished product exist in case of these compounds too.

In the series of the new soluble derivatives of the corticosteroids, compounds have been described which contain substituted amino groups on the carbon atoms of position 21. According to literature data these compounds keep the corticoid effect of the basic compound in decreased degree. Such compounds are described in U.S. patent specification No. 2,920,999 the claims of which are limited to chains and rings containing solely one amino group. From the rings containing two hetero atoms, only the morpholine is mentioned. The solubilities of these compounds, however, do not comply with the requirements.

When systematically changing the molecule of corticosteroids, we aspired to obtain water-soluble, stable derivatives free from the above-mentioned disadvantages, which have a favourable pharmacological effect and can be easily confectionated.

During this work corticosteroid derivatives having in position 21 a substituted amino group have been prepared as well. In confectionating the finished products difficulties arose but their pharmacological effect proved favourable; therefore, in spite of the above-mentioned difficulties, the preparation of compounds of similar type was aspired to.

It has been found that the new derivatives of hydrocortisone and prednisolone substituted in position 21 with piperazine derivatives selected from the class consisting of

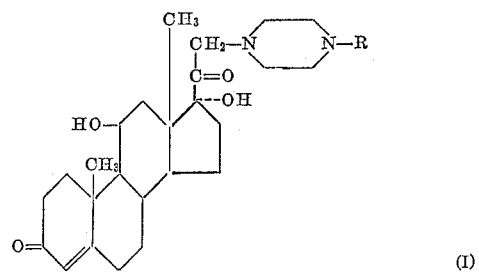

(I)

and their $\Delta^1$-dehydro derivatives, wherein R is a member selected from the group consisting of lower alkyl and lower hydroxy alkyl, and the nontoxic addition salts thereof, keep the effect preventing inflammations; this effect being characteristic of the corticosteroids. Further on, it has been found that the salts of these compounds are excellently soluble in water, the structure of these compounds being such as to make it possible to continue to systematically build up the molecule chemically. These compounds can be employed together with a pharmaceutically acceptable carrier as well.

These new corticosteroid derivatives complying with the above-described general Formula I are prepared by reacting a corticosteroid derivative selected from the class consisting of

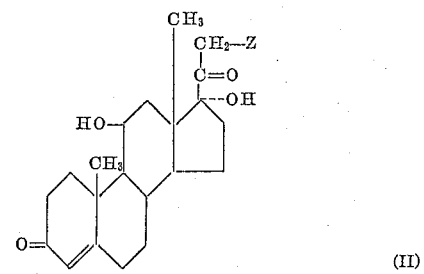

(II)

and their $\Delta^1$-dehydro derivatives, wherein Z is selected from the group consisting of bromine and iodine atoms, alkyl and aryl sulphonic acid ester radicals, with a piperazine derivative selected from the class consisting of

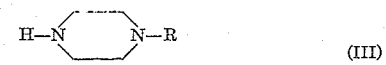

(III)

wherein R is selected from the group consisting of lower alkyl and hydroxy alkyl radicals. The product thus obtained can be transformed with an acid to an addition salt too.

As the starting compound of general Formula II, the 21-iodo or 21-bromo derivative or the 21-tosyl ester of the prednisolone and hydrocortisone, respectively, can be advantageously employed whereas for forming the addition salts, non-toxic inorganic or organic acids, e.g. hydrochloric acid, hydrobromic acid, acetic acid or fumaric acid can be employed.

When preparing the compounds according to the invention, the 21-bromo or 21-iodo derivative, or the sulfonic acid ester of the required corticosteroid is dissolved in an indifferent solvent, e.g. in tetrahydrofuran, and the solution thus obtained is reacted with 2 moles or a surplus quantity of the required piperazine derivative. The reaction takes place in from 4 to 100 hours. The temperature of the reaction ranges from room temperature to 120° C. It is advantageous to use a temperature not exceeding 60° C. and to carry out the reaction in an indifferent gas atmosphere.

When working up the reaction mixtures, one proceeds as follows: After evaporating the solvent, the product left over is triturated with water whereby the base used in excess as well as its salt are dissolved. Then the crystalline piperazyl steroid derivative being left over is crystallized.

The salts of the compounds prepared according to the process of the invention can be prepared in the known way. These salts can be excellently dissolved in water.

These compounds and their salts, respectively, which, from physiological point of view, are not toxic, show a suitable pharmacological activity.

The invention is further illustrated by the following examples.

EXAMPLE 1

*Preparation of 11β-17α-Dihydroxy-3,20-Dioxo-21- (N'-Methyl Piperazinyl)-1,4-Pregnadiene*

(a) 5 g. (0.0095 mole) of 21-tosyl ester of prednisolone are dissolved in 20 ml. of absolute tetrahydrofuran, then 2.91 g. (0.029 mole) of N-methyl piperazine are added. While continuously introducing nitrogen, the reaction mixture is kept at a temperature of 55–60° C. for 14 hours. Thereafter the tetrahydrofuran is distilled off, then about 150 ml. of water are added to the residue. The precipitated white crystalline substance is filtered, washed with water, and over $P_2O_5$ dried in vacuo (3.91 g). The substance is recrystallized from the mixture of tetrahydrofuran and petroleum ether; M.P. 199° C. (with decomposition). The melting point of its hydrochloric salt amounts to 246° C. (decomposition).

*Analysis* (drying at 110° C. for 5 hours).—Base, calculated: C, 70.58%; H, 8.59%; N, 6.33%. Found: C, 70.41%; H, 8.50%; N, 6.24%.

Hydrochloric salt, calculated: C, 60.58%; H, 7.78%; $Cl^{(-)}$, 13.78%. Found: C, 50.41%; H, 7.75%; $Cl^{(-)}$, 13.62%.

(b) 1 g. (0.0021 mole) of 11β-17α-dihydroxy-3,20-dioxo-21-iodo-1,4-pregnandiene is dissolved in 10 ml. of absolute tetrahydrofuran, then 0.47 g. (0.047 mole) of N-methyl piperazine are added. While continuously introducing nitrogen, the reaction mixture is kept at 55° C. for 5 hours. Thereafter the tetrahydrofuran is distilled off, then 30 ml. of water are added to the residue. The separated, slightly yellow substance is washed with water, then with a small amount of sodium thiosulfate solution. The product is dried over $P_2O_5$ in vacuo (0.87 g.). It is recrystallized from a mixture of tetrahydrofuran and petroleum ether; M.P. 199° C.

*Analysis.*—Calculated: C, 70.58%; H, 8.59%; N, 6.35%. Found: C, 70.46%; H, 8.6%; N, 6.20%.

EXAMPLE 2

(a) *Preparation of 11β-17α-Dihydroxy-3,20-Dioxo-21- (N'-β-Hydroxy Ethyl Piperazinyl)-1,4-Pregnadiene*

5 g. (0.0095 mole) of 21-tosyl ester of prednisolone are dissolved in 20 ml. of absolute tetrahydrofuran, then 3.71 g. (0.028 mole) of N-β-hydroxy ethyl piperazine are added. While continuously introducing nitrogen, the reaction mixture is left to stand at 55–60° C. for 14 hours. Thereafter the tetrahydrofuran is distilled off, then 150 ml. of water are added to the residue. The precipitated white crystalline substance is filtered, washed with water, and dried over $P_2O_5$ in vacuo (4.47 g.). It is recrystallized from the mixture of tetrahydrofuran and petroleum ether; M.P.: 204° C. (with decomposition). The melting point of its hydrochloric salt amounts to 235° C. (with decomposition).

*Analysis* (drying at 110° C. for 5 hours).—Base, calculated: C, 68.64%; H, 8.47%; N, 5.95%. Found: C, 68.38%; H, 8.42%; N, 5.82%.

Hydrochloric salt, calculated: C, 59.44%; H, 7.70%; N, 5.14%; $Cl^{(-)}$, 13.02%. Found: C, 59.40%; H, 7.75%; N, 5.01%; $Cl^{(-)}$, 13.01%.

(b) 1 g. (0.0021 mole) of 11 β-17α-dihydroxy-3,20-dioxo-21-iodo-1,4-pregnadiene is dissolved in 10 ml. of absolute tetrahydrofuran, then 0.62 g. (0.0048 mole) of N-β-hydroxy ethyl piperazine are added. While continuously introducing nitrogen, the reaction mixture is left to stand at 55° C. for 5 hours. Thereafter the tetrahydrofuran is distilled off, then 30 ml. of water are added to the residue. The precipitated, slightly yellow substance is washed with water, then with a small amount of sodium thiosulfate solution. The product is dried over $P_2O_5$ in vacuo (0.7 g.). It is recrystallized from the mixture of tetrahydrofuran and petroleum ether; M.P.: 204° C.

*Analysis.*—Calculated: C, 68.64%; H, 8.47%; N, 5.95%. Found: C, 68.39%; H, 8.5%; N, 5.71%.

What we claim is:

1. A steroid compound selected from the class consisting of

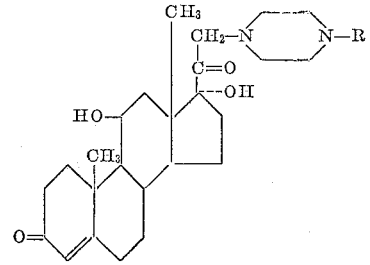

and their Δ¹-dehydro derivatives wherein R is a member selected from the group consisting of lower alkyl and lower hydroxy alkyl, and the nontoxic addition salts thereof.

2. 11β-17α-dihydroxy, 3,20 - dioxo - 21 - N(N' - methylpiperazinyl)-1,4-pregnadiene.

3. 11β-17α - dihydroxy - 3,20 - dioxo - 21 - N(N'-β-hydroxy-ethyl-piperazinyl)-1,4-pregnadiene.

References Cited in the file of this patent
UNITED STATES PATENTS
2,720,523    MacPhillamy _____ Oct. 11, 1955